(12) United States Patent
Bai et al.

(10) Patent No.: US 11,520,137 B2
(45) Date of Patent: Dec. 6, 2022

(54) WAVELENGTH CONVERSION ELEMENT WITH CONVECTIVE COOLING

(71) Applicant: MATERION PRECISION OPTICS (SHANGHAI) LIMITED, Shanghai (CN)

(72) Inventors: Shengyuan Bai, Shanghai (CN); Guanghui Fu, Shanghai (CN); Qiming Li, Shanghai (CN)

(73) Assignee: MATERION CORPORATION, Mayfield Heights, OH (US)

( * ) Notice: Subject to any disclaimer, the term of this patent is extended or adjusted under 35 U.S.C. 154(b) by 0 days.

(21) Appl. No.: 17/056,849

(22) PCT Filed: Jul. 27, 2018

(86) PCT No.: PCT/CN2018/097409
§ 371 (c)(1),
(2) Date: Nov. 19, 2020

(87) PCT Pub. No.: WO2020/019292
PCT Pub. Date: Jan. 30, 2020

(65) Prior Publication Data
US 2021/0231944 A1 Jul. 29, 2021

(51) Int. Cl.
  *G02B 26/00* (2006.01)
  *G03B 21/16* (2006.01)
  *G03B 21/20* (2006.01)
(52) U.S. Cl.
  CPC .......... *G02B 26/008* (2013.01); *G03B 21/16* (2013.01); *G03B 21/204* (2013.01)

(58) Field of Classification Search
  CPC ..... G02B 26/008; G03B 21/204; G03B 21/16
  See application file for complete search history.

(56) References Cited

U.S. PATENT DOCUMENTS

| | | | |
|---|---|---|---|
| 9,983,467 B2 | 5/2018 | Kitade et al. | |
| 2001/0036405 A1 | 11/2001 | Yokoyama et al. | |

(Continued)

FOREIGN PATENT DOCUMENTS

| | | |
|---|---|---|
| CN | 101842584 A | 9/2010 |
| CN | 203259763 A | 10/2013 |

(Continued)

OTHER PUBLICATIONS

Alla Petukhova et al.; Extinction analysis of dielectric multilayer microspheres; Applied Physics Letter, vol. 90, No. 21, Nov. 20, 2006; p. 211908.

(Continued)

*Primary Examiner* — Magda Cruz
(74) *Attorney, Agent, or Firm* — Tucker Ellis LLP

(57) ABSTRACT

A phosphor wheel comprises a disk, a wavelength conversion layer comprising phosphor disposed on the disk, and an impeller disposed on the disk. The impeller comprises vanes which are shaped as airfoils with each vane oriented to drive outward airflow across the disk and across the wavelength conversion layer when the disk is rotated in the rotation direction. The wavelength conversion layer may be disposed at a larger radial position than the impeller on the disk, and may optionally be an annular wavelength conversion layer. In operation, a light source is arranged to output a pump beam impinging on the wavelength conversion layer while the disk rotates.

27 Claims, 5 Drawing Sheets

(56) References Cited

U.S. PATENT DOCUMENTS

| | | | |
|---|---|---|---|
| 2010/0124483 A1* | 5/2010 | Weaver | F01D 5/082 |
| | | | 415/115 |
| 2016/0077326 A1* | 3/2016 | Yamagishi | G02B 7/008 |
| | | | 353/61 |
| 2017/0023188 A1 | 1/2017 | Kazuma | |
| 2017/0205692 A1* | 7/2017 | Aoki | G03B 21/16 |
| 2017/0328541 A1 | 11/2017 | Hiroyuki | |
| 2017/0353701 A1* | 12/2017 | Egawa | H04N 9/3105 |
| 2018/0031957 A1* | 2/2018 | Egawa | H04N 9/3158 |
| 2018/0095348 A1 | 4/2018 | Asano | |
| 2018/0106447 A1 | 4/2018 | Hidetada et al. | |
| 2018/0216473 A1* | 8/2018 | Hill | F01D 5/187 |
| 2018/0306058 A1* | 10/2018 | Lewis | F01D 25/12 |
| 2019/0072264 A1* | 3/2019 | Nagatani | F21V 29/502 |

FOREIGN PATENT DOCUMENTS

| | | |
|---|---|---|
| CN | 104280990 A | 1/2015 |
| CN | 104614926 A | 5/2015 |
| CN | 103703414 B | 1/2016 |
| CN | 205003431 U | 1/2016 |
| CN | 105511213 A | 4/2016 |
| CN | 106054510 A | 3/2017 |
| CN | 106990653 A | 7/2017 |
| JP | 2012181431 | 9/2012 |
| JP | 2012181431 A | 9/2012 |
| JP | 2014503110 | 2/2014 |
| JP | 201653608 | 4/2016 |
| JP | 201666061 | 4/2016 |
| JP | 2017215536 | 12/2017 |

OTHER PUBLICATIONS

PCT/US2019/043371; 5 pgs. International Opinion of the Intl. Searching Authority; dated Oct. 10, 2019.
Intl. Search Report PCT/US2019/043371; 4 pgs.; dated Oct. 10, 2019.
International Preliminary Report and Written Opinion from corresponding International Application No. PCT/CN2018/097409, dated Feb. 2, 2021, 6 pages.
Extended EP Search Report—Appl. No. 18928088.6; 8 pages; dated Feb. 11, 2022.
International Search Report dated Apr. 30, 2019 for Application Serial No. PCT/CN2018/097409 (2 pages).
Chinese Search Report dated Oct. 25, 2021 for Application Serial No. 2018800945638 (2 pages).

* cited by examiner

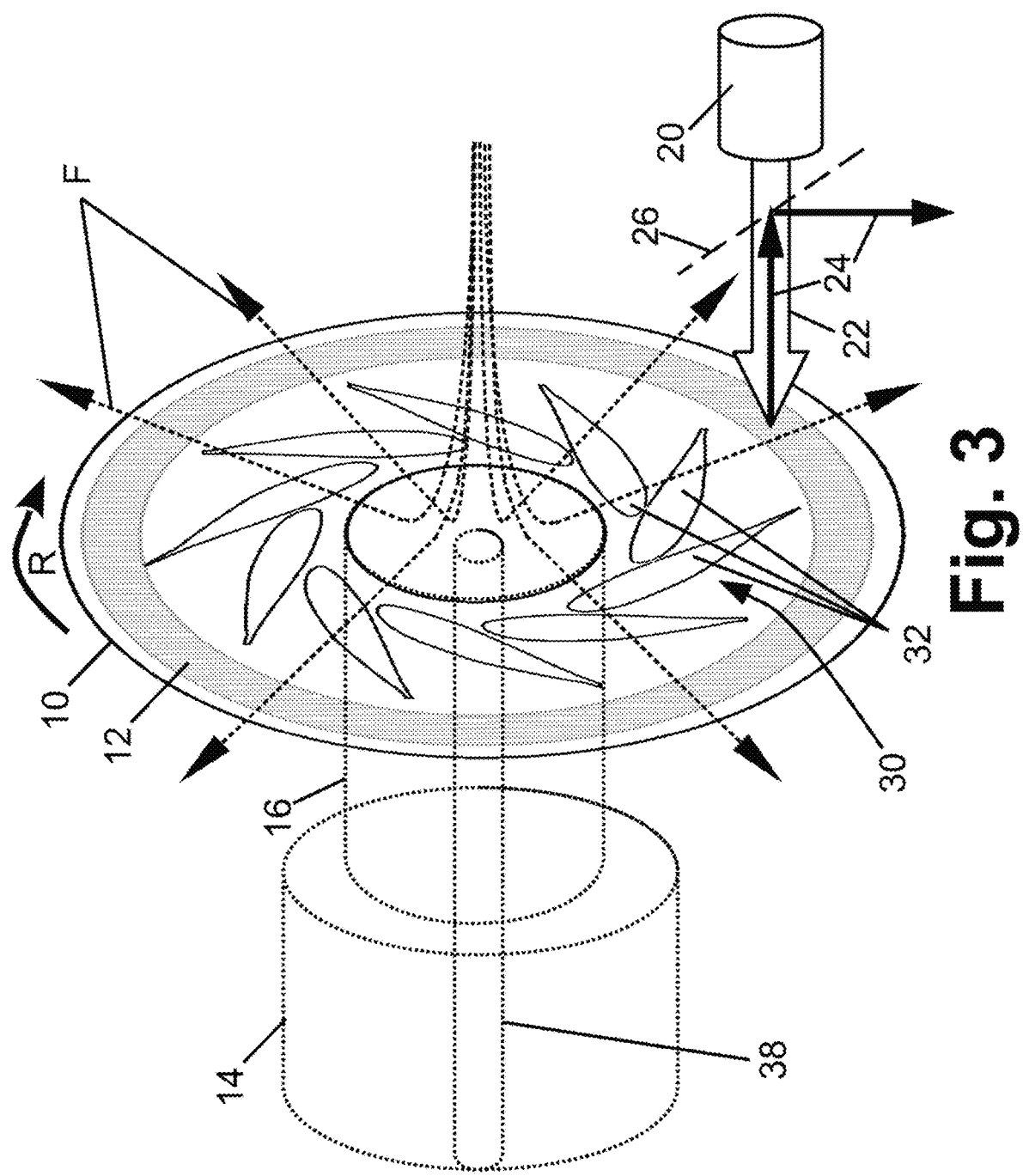

WAVELENGTH CONVERSION ELEMENT WITH CONVECTIVE COOLING

BACKGROUND

The following relates to the illumination arts, phosphor wheel arts, and related arts.

A phosphor wheel is a wavelength conversion device for converting (for example) blue light to yellow light. In a phosphor wheel configuration, the phosphor is deposited at the periphery of a rotating wheel that is made of metal or another thermally conductive material. A light source (e.g. blue laser) applies high power light (e.g. blue light in the power range of watts, tens of watts, or a hundred watts or more in some designs) to the phosphor which converts a portion or all of the incident (e.g. blue) light to wavelength-converted (e.g. yellow) light. An advantage of a phosphor wheel over a "static" phosphor is that heat is distributed over the annular perimeter of the wheel, thereby reducing heating of the phosphor.

Some improvements are disclosed herein.

BRIEF SUMMARY

In one disclosed aspect, a phosphor wheel comprises: a disk; a wavelength conversion layer comprising phosphor disposed on the disk; and an impeller disposed on the disk. The impeller comprises vanes which are shaped as airfoils, with each vane oriented to drive outward airflow across the disk including across the wavelength conversion layer when the disk is rotated in the rotation direction. In some embodiments, the wavelength conversion layer is disposed at a larger radial position than the impeller on the disk, and may optionally be an annular wavelength conversion layer. An electric motor may further be provided, operatively coupled with the disk to rotate the disk in the rotation direction. A light source may further be provided, arranged to output a pump beam impinging on the wavelength conversion layer. The light source may, for example, be a laser or a light emitting diode (LED). For full color or white light applications, it may be useful for the light source to output the pump beam comprising blue or ultraviolet light having a largest spectral peak at or below 500 nm, and for the phosphor to emit wavelength converted light with one or more spectral peaks at or above 500 nm (e.g. yellow, red, and/or green peaks, by way of non-limiting illustrative example).

In another disclosed aspect, a wavelength conversion method comprises: rotating a disk in a rotation direction using an electric motor; while rotating the disk in the rotation direction, optically pumping a wavelength conversion layer comprising phosphor disposed on the disk to generate wavelength converted light; and while rotating the disk in the rotation direction, driving airflow across the wavelength conversion layer disposed on the disk using an impeller comprising airfoil-shaped vanes disposed on the disk wherein the impeller is operated by the rotating of the disk in the rotation direction.

In another disclosed aspect, a method of manufacturing a phosphor wheel is disclosed. The method comprises disposing a wavelength conversion layer comprising phosphor on a disk, and disposing or forming an impeller comprising airfoil-shaped vanes on the disk. The disposing of the wavelength conversion layer on the disk may consist of one of: (i) depositing material forming the wavelength conversion layer on the disk; or (ii) adhering the wavelength conversion layer onto the disk. The disposing or forming of the impeller on the disk comprises, in one embodiment, adhering vanes of the impeller onto the disk using an adhesive. The disposing or forming of the impeller on the disk comprises, in another embodiment, depositing vane material forming vanes of the impeller onto the disk. The disposing or forming of the impeller on the disk comprises, in another embodiment, forming vanes of the impeller by sheet metal stamping (in this embodiment the disk typically comprises sheet metal).

BRIEF DESCRIPTION OF THE DRAWINGS

FIG. 3 diagrammatically shows a perspective view of the phosphor wheel of FIGS. 1 and 2 operatively connected with an electric motor and optically pumped by a light source.

DETAILED DESCRIPTION

Figure 2:
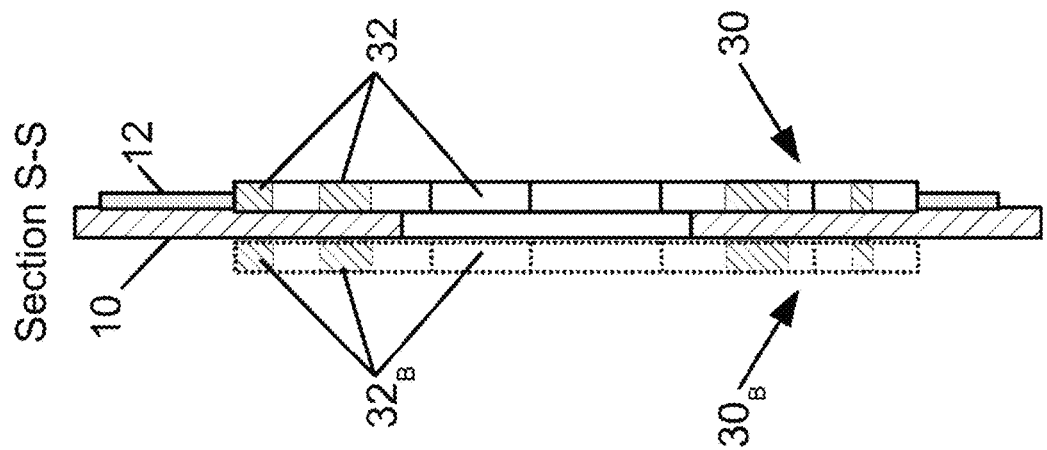
FIG. 2 diagrammatically shows Section S-S indicated in FIG. 1.

As earlier noted, a phosphor wheel reduces heating of the phosphor compared with a static phosphor by distributing the heat over the annular periphery along which the phosphor is disposed. However, the phosphor wheel does not completely eliminate heating, and the phosphor can reach temperatures in excess of 90° C. in some commercial wavelength conversion devices that employ a phosphor wheel. In general, such heating can be expected to increase with increasing optical input power (e.g. using a higher power laser to pump the phosphor), and/or with reduction in the wheel diameter and consequently reduced annular path length around the wheel periphery. Wheel diameter reduction may be advantageous in certain applications in which miniaturization is beneficial. Such heating of the phosphor can have detrimental effects such as reduced wavelength conversion efficiency (e.g. thermal quenching) and/or potential heat degradation of the phosphor and/or the phosphor binder over time. In another heat-induced failure mode, adhesive used to bond the phosphor to the wheel may be cracked or lose bonding strength. For example, when the temperature gets higher than 185° C., silicone glue used in bonding some types of phosphor-containing wavelength conversion layers to the disk substrate have been observed to start to fail.

In embodiments disclosed herein, a phosphor wheel includes a disk, a wavelength conversion layer comprising phosphor disposed on the disk, and an impeller disposed on disk to drive airflow across the wavelength conversion layer when the disk is rotated in a rotation direction. This approach advantageously leverages the existing rotational motive force applied to the phosphor wheel by a motor to provide convective cooling of the wavelength conversion layer. The impeller typically comprises vanes which in illustrative embodiments are shaped as airfoils. In some embodiments, each vane is shaped as an airfoil having its leading edge disposed radially inward of its trailing edge on the disk. Each impeller vane is oriented to drive outward airflow across the disk including across the wavelength conversion layer when the disk is rotated in the rotation direction. In this way, direct convective cooling of the phosphor layer is obtained. The airfoil shape typically has a rounded leading edge and a sharp trailing edge, and may have a widest cross-section at a point between the rounded leading edge and the sharp trailing edge, with the more detailed shape chosen to provide specific airflow characteristics.

In operation, the disk is rotated in a rotation direction (e.g. clockwise or counterclockwise) using an electric motor. While rotating the disk in the rotation direction, the wavelength conversion layer comprising phosphor disposed on the disk is optically pumped to generate wavelength converted light. As mentioned above, by way of the rotation the heat deposited by the optical pump beam, e.g. a laser beam in the watts to hundred(s) watts range in some embodiments, is spread out over an annular path. If the annular wavelength conversion layer is placed at a large radius, e.g. at or near the periphery of the disk, the length of this annular path is maximized so as to maximize heat distribution. Additionally, while rotating the disk in the rotation direction, airflow is driven across the wavelength conversion layer disposed on the disk using the impeller disposed on the disk. The impeller is operated by the rotating of the disk in the rotation direction. Hence, the convective cooling is obtained for free due to the already-imposed rotation of the phosphor wheel, except for a certain amount of additional drag imposed by the impeller. This drag can be reduced by constructing the impeller to be of low profile, e.g. the impeller protrudes from a surface of the disk on which the impeller is disposed by 2.0 mm or less in some embodiments, and/or by constructing the impeller to be highly aerodynamic and to impose minimal drag, for example by shaping the vanes as airfoils as in some illustrative embodiments described herein.

Figure 1:
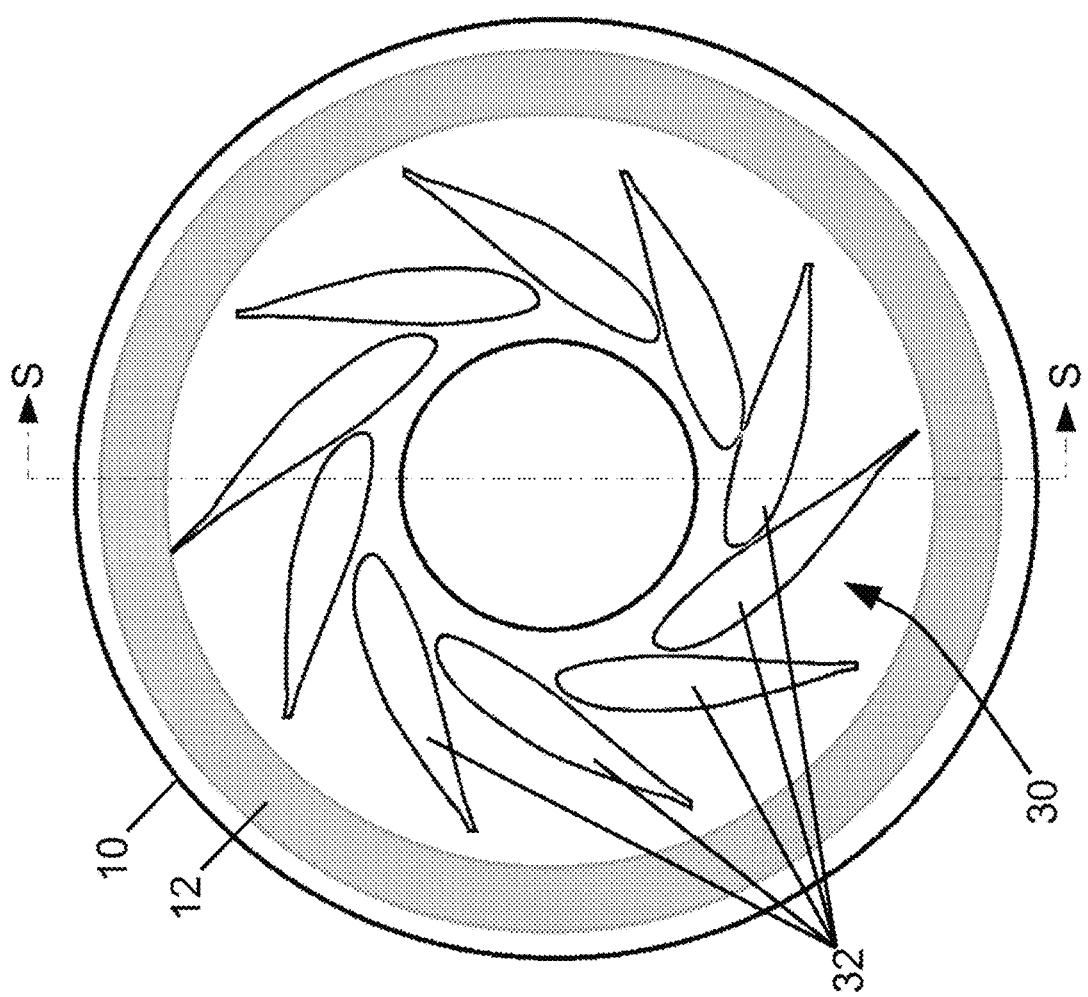
FIG. 1 diagrammatically shows a front view of a phosphor wheel.

With reference to FIGS. 1-3, an illustrative phosphor wheel of the above design is illustrated in front view (FIG. 1), side-sectional view (FIG. 2 showing Section S-S indicated in FIG. 1), and in perspective view further including motorization and optical pumping (FIG. 3). The phosphor wheel includes a disk 10 on which is disposed a wavelength conversion layer 12 comprising a phosphor typically disposed in a binder material. The disk 10 may, for example, be a circular metal plate made of sheet metal or the like. Other materials are contemplated for the disk 10 (e.g. plastic, ceramic). The disk 10 preferably has high thermal conductivity to provide some conductive heat sinking of the wavelength conversion layer 12.

As mentioned above, the wavelength conversion layer 12 comprises a phosphor typically disposed in a binder material. In an illustrative example, the phosphor is operative to convert the short wavelength light (e.g. blue or ultraviolet light having a largest spectral peak at or below 500 nm) to wavelength converted light (e.g. yellow light, or as another example a mixture of phosphors outputting green and red light components, respectively, in illustrative embodiments the wavelength converted light has one or more spectral peaks in the visible spectrum at or above 500 nm). To form the wavelength conversion layer 12, the phosphor is suitably dispersed in a light-transmissive binder at a concentration effective to provide the desired amount of light conversion. By way of some non-limiting illustrative examples, some suitable yellow phosphors include cerium-substituted yttrium aluminum garnet (YAG:Ce), cerium-substituted terbium aluminum garnet (TAG:Ce), europium-substituted barium orthosilicate (BOS), or another suitable phosphor operative to convert the blue light to longer-wavelength visible light, e.g. yellow light. The binder may, for example, comprise a ceramic, a silicone, an epoxy, a plastic (e.g. styrene, a styrene-acrylic copolymer, polycarbonate, polyolefin, polymethylmethacrylate) or so forth.

As illustrated in FIG. 3, during operation the disk 10 on which the wavelength conversion layer 12 is disposed is rotated in a rotation direction R (e.g., clockwise in some embodiments, or counterclockwise in other embodiments) by an electrical motor 14 operatively connected with the disk 10 by way of an illustrative drive shaft 16 or other suitable rotational coupling. (Note, the motor 14 and shaft 16 are drawn in dotted lines in FIG. 3 to distinguish from other illustrated components). In one design, the shaft 16 shown in FIG. 3 mechanically connects with a central opening 17 of the disk 10 is shown in FIGS. 1 and 2, but this is merely one non-limiting illustrative operative coupling of the motor 14 and disk 10. As another non-limiting example of an operative coupling (not shown), the disk may have no opening and the shaft may be welded or otherwise connected to the disk.

While rotating the disk 10 in the rotation direction R, the wavelength conversion layer 12 is optically pumped by a light source 20 to generate wavelength converted light. The light source 20 may, for example, be a laser or a light emitting diode (LED). The pump beam 22 impinges on the wavelength conversion layer 12 to generate wavelength converted light 24. The phosphor wheel of FIGS. 1-3 is a reflective phosphor wheel in which the disk 10 is reflective for the wavelength converted light (and typically though not necessarily also for the pump light 22) in other embodiments (not shown) the phosphor wheel may be a transmission phosphor wheel in which the disk is optically transmissive for the wavelength converted light (and optionally also for the pump light). For a complete light source, suitable optics may be provided to collect and direct the wavelength converted light 24—in the illustrative example of FIG. 3 such suitable optics comprise a wavelength-selective mirror 26 which passes (i.e. is transmissive for) the pump light 22 but reflects the wavelength converted light 24. In a variant approach, if the output light is to include a portion of reflected pump light 22 then the wavelength-selective mirror 26 can be partially reflective for the pump light 22 as well. The illustrative wavelength-selective mirror 26 is merely an example, and any type of light collecting/directing optics conventionally used in conjunction with a phosphor wheel may be employed as appropriate for an intended commercial application.

Figure 4:
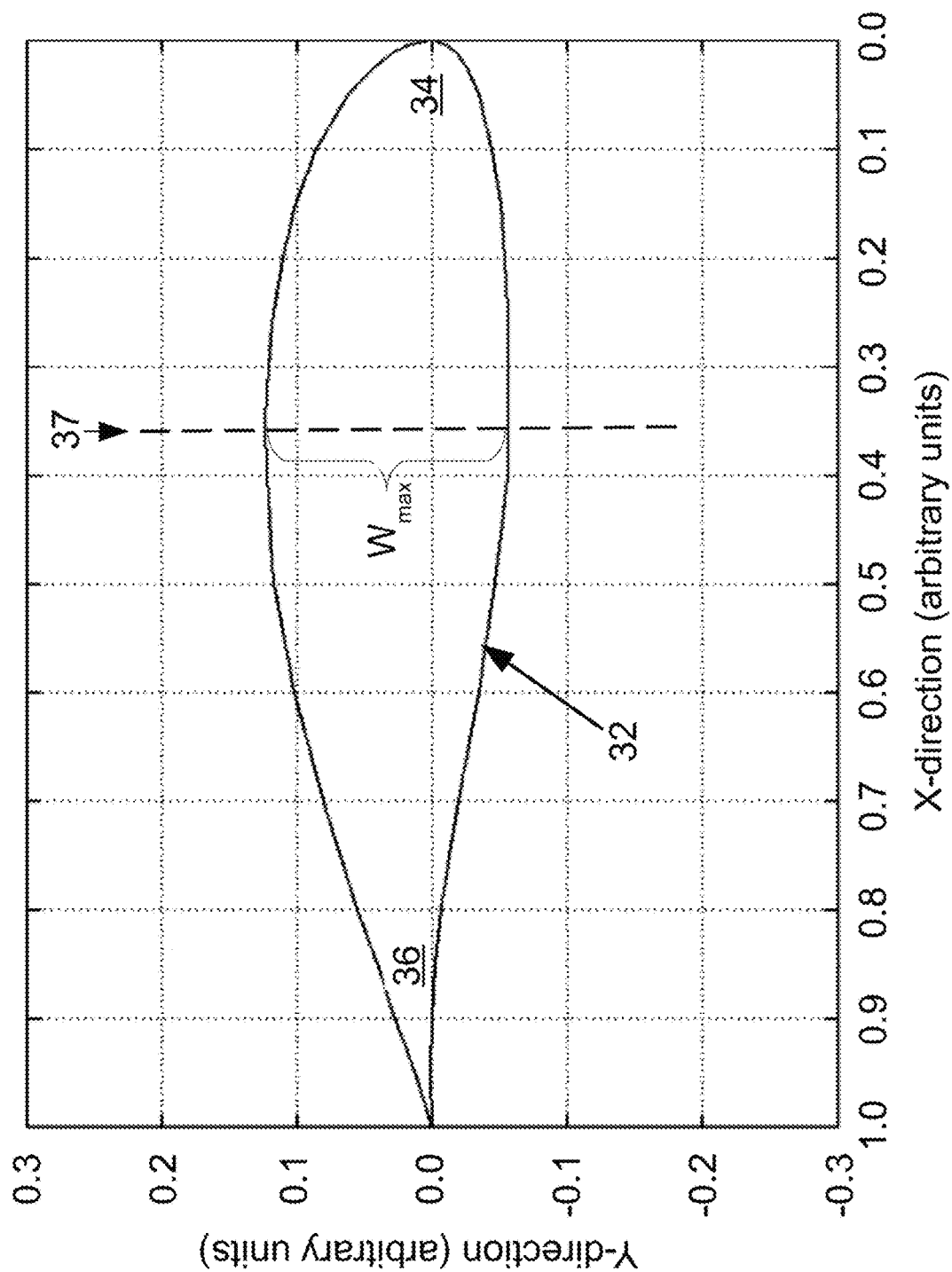
FIG. 4 diagrammatically shows an enlarged view of one airfoil-shaped vane of the impeller of the phosphor wheel of FIGS. 1-3.

With continuing reference to FIGS. 1-3 and with further reference to FIG. 4, the phosphor wheel further includes an impeller 30 disposed on the disk 10 to drive outward airflow F across the disk 10, including across the wavelength conversion layer 12 which is disposed on the disk 10, when the disk 10 is rotated in the rotation direction R by the motor 14. By using the impeller 30, the airflow F is directed outward, that is, having a principle flow component in the outward radial direction away from the center-of-rotation of the disk 10. By this approach, direct convective cooling of the wavelength conversion layer 12 is achieved. The illustrative impeller 30 includes vanes 32 to drive the outward airflow F. In the illustrative embodiment the vanes 32 are shaped as airfoils. FIG. 4 shows an illustrative airfoil-shaped vane 32 that is suitable for some designs. The airfoil shape has a rounded leading edge 34 and a sharp trailing edge 36, and as best seen in FIG. 1 each airfoil has its leading edge disposed radially inward of its trailing edge on the disk 10. The illustrative airfoils also have a widest cross-section 37 of maximum width (indicated as maximum width $W_{max}$ in FIG. 4) which is located between the rounded leading edge 34 and the sharp trailing edge 36. Each vane 32 is oriented to drive outward airflow across the disk 10 including across the wavelength conversion layer 12 when the disk 10 is rotated in the rotation direction R. In diagrammatic FIG. 3, the airflow F is represented by a few discrete lines, but will be appreciated to extend over most or all of the plane of the disk 10. Moreover, while the illustrative lines indicating the airflow F in FIG. 3 are straight, it will be appreciated that the airflow may have some curvature, that is, the airflow imparted by the impeller 30 may not be directed precisely radially away from the center of the disk 10 but rather may curve due to its possessing some tangential flow component as well. The precise airflow pattern imparted by the impeller 30 depends on the detailed shapes and positioning of the vanes 32 of the impeller 30, as well as on the rotational speed of the rotation of the disk 10 in the rotation direction R and possibly may secondarily depend on other factors such as humidity, air pressure, or so forth. The design of the detailed shape and placement of the vanes 32 is suitably performed using known impeller design techniques including, by way of illustrative example, computer simulation of the airflow for various designs to identity a satisfactory design.

The use of airfoil-shaped vanes 32 in the illustrative impeller 30 as best seen in FIG. 4 has certain advantages. The rounded leading edge 34 of the airfoil reduces drag. The airfoil is aerodynamic, air flow speed on the outskirt is maximized, the noise is low, and due to the low drag the counter-torque exerted on the motor 14 is also low. However, the vanes can have shapes other than airfoil shapes, such as being shaped as curved rib-shape vanes having curvature designed to impart the desired airflow F.

It will be further appreciated that the impeller 30 is typically designed to provide the desired airflow F over the disk 10 including over the wavelength conversion layer 12 when the disk is rotated in the (correct) rotation direction R. If the rotation is in the opposite direction then the impeller 30 may still provide some beneficial airflow over the disk 10 including over the wavelength conversion layer 12, but the efficiency in creating the airflow will be reduced, and additionally the effect will be to draw heat toward the center of the disk 10.

In the illustrative phosphor wheel, the wavelength conversion layer 12 is disposed on a single side of the disk 10, and the impeller 30 comprises vanes 32 with all vanes 32 of the impeller 30 disposed on the same side of the disk 10 as the wavelength conversion layer 12. This ensures that full airflow F generated by the impeller 30 passes over the wavelength conversion layer 12.

With particular reference to FIG. 2, in a variant embodiment the impeller includes a first impeller 30 comprising a first set of vanes 32 disposed on a first side of the disk (on which side the wavelength conversion layer 12 is also disposed), and a (second) impeller $30_B$ on a "backside" of the disk 10. The second impeller $30_B$ comprises second set of vanes $32_B$ disposed on a second side of the disk 10 opposite from the first side of the disk. The impeller $30_B$ is shown by dotted lines in FIG. 2 to emphasize that including the second impeller $30_B$ is optional and forms a variant embodiment.

In the illustrative embodiment of FIGS. 1-3, the wavelength conversion layer 12 is disposed at a larger radial position than the impeller 30 on the disk 10. This is advantageous because the airflow F can be designed (e.g. using airfoil-shaped vanes 32) to have fastest airspeed at the outermost radius of the impeller 30. The illustrative arrangement also allows for the wavelength conversion layer 12 to be formed as a continuous annular ring with no breaks, which can thereby provide a continuous output for the wavelength converted light 24. However, in other contemplated embodiments the phosphor may be disposed in part or in whole between vanes of the impeller. This might be appropriate if, for example, the phosphor is arranged as red, green, and blue patches (with appropriate phosphor and/or reflector for each color) to provide a time sequence of red, green, and blue light for time-domain multiplexed (TDM) full color display.

In the illustrative embodiment, the airflow F is drawn into the impeller 30 from the side opposite from the motor 14, i.e. from the same side on which the impeller 30 is disposed (assuming here that the second impeller $30_B$ is omitted). In a variant embodiment, an airflow path 38 (see FIG. 3) is optionally provided via which air can be drawn into the impeller 30 from the motor-side, through the disk 10.

Figure 5:
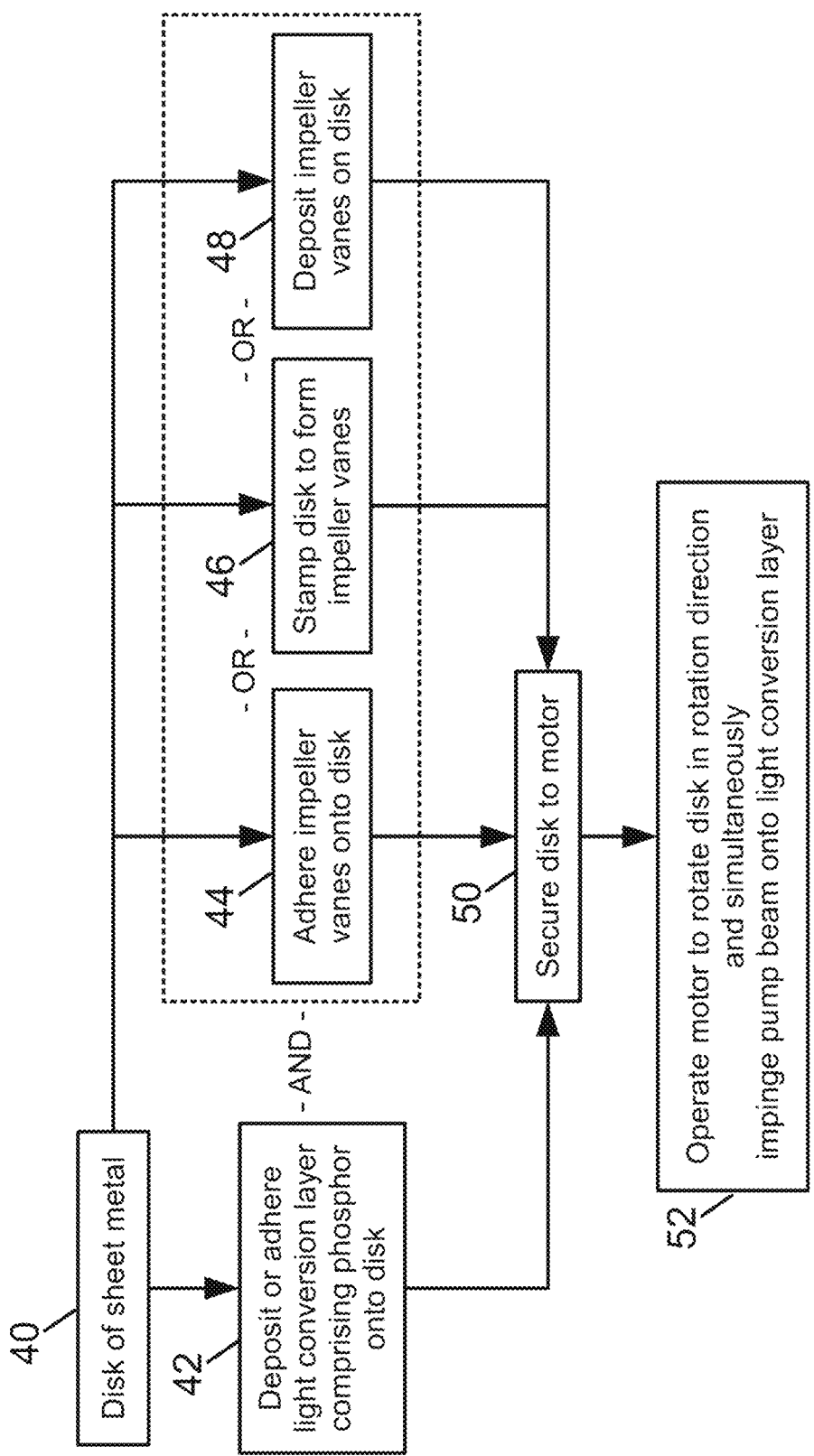
FIG. 5 diagrammatically shows some suitable manufacturing and operational processes for manufacturing and using the phosphor wheel of FIGS. 1-3.

With reference now to FIG. 5, an illustrative approach for manufacturing and using a phosphor wheel such as that of illustrative FIGS. 1-3 is described. The disk 10 is stamped from a disk of sheet metal 40, or alternatively is cut from suitable ceramic or plastic sheet stock. In an operation 42, the light conversion layer 12 is deposited onto the disk 10 (for example, using sputtering or another deposition technique), or is adhered onto the disk 10 using an adhesive such as glue. To form the impeller 30, the vanes 32 are formed by a suitable approach. In illustrative FIG. 5, three non-limiting examples of suitable vane formation approaches are indicated. In a first approach (i.e. operation) 44, the impeller vanes 32 are adhered to the disk 10 using glue or another suitable adhesive. The vanes 32 in this approach are manufactured as separate components that are adhered to the disk 10. As a non-limiting example, the vanes 32 may be machined from stock metal such as aluminum stock, and glued to the disk 10, which may for example be an aluminum disk in this specific embodiment.

In an alternative second approach (i.e. operation 46), the disk 10 is made of sheet metal which is protruding from the disk and formed by sheet metal stamping. Any suitable sheet metal stamping approach can be used to generate the appropriate deformation of the sheet metal to define the vanes 32, such as sheet metal punching, sheet metal pressing, or so forth. The sheet metal stamping may merely deform the sheet metal to form the vanes 32, or may partially break the sheet metal to form partially detached tabs or the like defining the vanes 32.

In an alternative third approach (i.e. operation) 48, the vanes 32 are formed by depositing vane material directly onto the surface of the disk 10. As non-limiting examples of this approach, the vanes 32 can be made by dispensing or printing glue to form the airfoil or other desired vane shape.

It will be appreciated that typically only one of the alternative approaches 44, 46, 48 (or some other approach) will be employed to form the vanes 32. Moreover, the order of the operation 42 creating the wavelength conversion layer 12 and the operation 44, 46, or 48 can be reversed, i.e. the wavelength conversion layer 12 can be formed before the vanes 32 or, vice versa, the vanes 32 can be formed before the wavelength conversion layer 12.

With continuing reference to FIG. 5, the manufacturing process continues by an operation 50 in which the disk 10 (now with the wavelength conversion layer 12 and the vanes 32 disposed thereon) is operatively secured to the motor 14, e.g. via the drive shaft 16 as shown in FIG. 3. The phosphor wheel may then be employed to perform wavelength conversion as indicated by operation 52, e.g. by operating the motor 14 to rotate the disk 10 in the rotation direction R and simultaneously impinging the pump beam 22 emitted by the light source 20 onto light conversion layer 12. As this occurs, the rotation automatically operates the impeller 30 to provide cooling.

The impeller 30 is preferably a low profile component, e.g. protruding 2.0 mm or less from the surface of the disk 10 on which it is disposed, and in some embodiments protruding (i.e. having a thickness) of 0.5 to 1.5 mm. However, a larger or smaller thickness (i.e. protrusion) of the impeller 30 is also contemplated. In general, a larger protrusion (thickness) provides more engagement with the air and hence more efficient convective cooling, at the cost of increased drag on the motor 14 and a bulkier design; whereas, a smaller protrusion (thickness) provides less engagement with the air and less efficient convective cooling, but provides the benefits of reduced drag on the motor 14 and a lower-profile design. With sufficiently low profile, the impeller 30 could also be retrofitted to an existing phosphor wheel without modifying the surrounding system.

The disclosed design has been reduced to practice. In the actually constructed phosphor wheel, the diameter of the disk 10 was 65 mm. The wavelength conversion layer 12 had a width (laterally, i.e. across the plane of the disk 10) of between 4 mm and 5 mm. The impeller vanes were shaped as shown in FIG. 4. The number of vanes 32 was 10, as illustrated in FIGS. 1 and 3. The vanes 32 were made of machined aluminum and had a total weight for all vanes of 1.3 grams. A rough measurement of air flow speed was done near the outer diameter of the disk 10, both with and without attachment of the vanes 32. Without the vanes 32 being attached, the air speed (i.e. wind speed) was 5.3 m/s at a rotation speed of 10800 RPM. With the vanes 32 attached, a thickness of 1 mm was added (due to the thickness of the added impeller 30), and the air speed was increased to 10.5 m/s at 10800 RPM, and 6.5 m/s at 7200 RPM. The noised increased by 2 dBA with the vanes 32 added. For a contemplated projector system application, 100 W pump laser power is to be applied to the wavelength conversion layer 12. After the vanes 32 were added, the output optical power was not changed; however, the temperature of the conversion material was reduced from 97° C. to 82° C., indicating effective cooling was being provided by the impeller 30.

Figure 6:
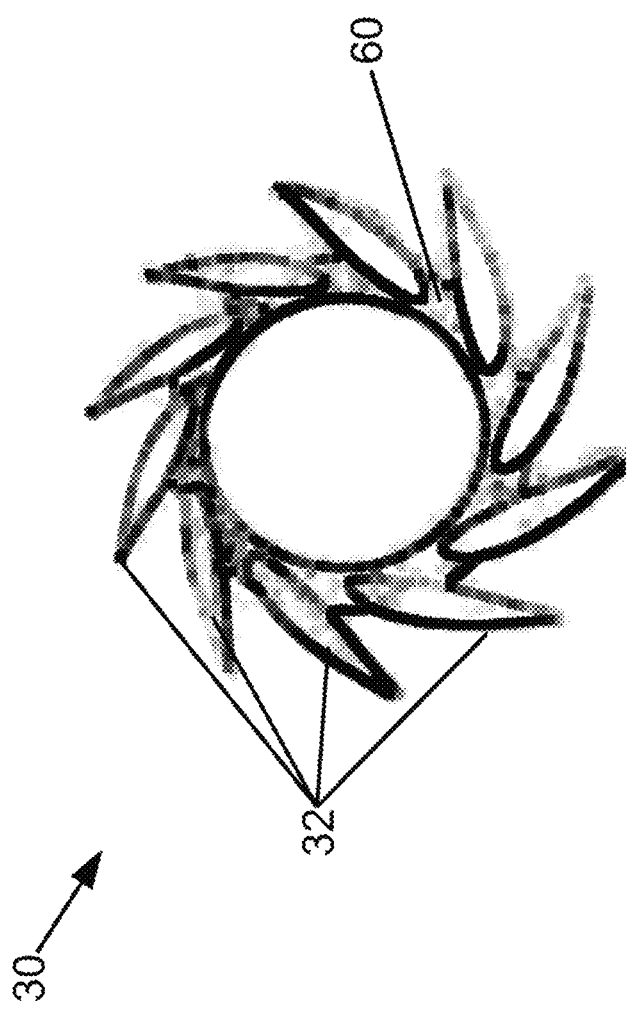
FIG. 6 diagrammatically shows a front view of a variant embodiment of the impeller of the embodiment of FIGS. 1-3.

With reference back to FIG. 3 and with further reference to FIG. 6, another example of an impeller 30 is shown. In this embodiment, the vanes 32 are adhered or welded to a central ring 60. For example, the vanes 32 and the central ring 60 may be made of an aluminum alloy or the like. This approach facilitates modular manufacture, as the vanes 32 are suitably first attached to the central ring 60 by adhesion, welding, or the like, and then the assembly 32, 60 is adhered, welded or otherwise attached to the disk 10. Additionally, the vanes 32 in this embodiment are spaced apart from the disk 10 by the thickness of the central ring 60 which can advantageously improve the outward airflow across the disk 10 and across the wavelength conversion layer 12 when the disk is rotated in the rotation direction R.

The invention has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A phosphor wheel comprising:
   a disk;
   a wavelength conversion layer comprising phosphor disposed on a first side of the disk; and
   an impeller disposed on the first side of the disk, the impeller comprising vanes which are shaped as airfoils with each vane oriented to drive outward airflow across the disk and across the wavelength conversion layer when the disk is rotated in a rotation direction.

2. The phosphor wheel of claim 1 wherein the vanes are shaped as airfoils with each airfoil having its leading edge disposed radially inward of its trailing edge on the disk and with each vane oriented to drive outward airflow across the disk and across the wavelength conversion layer when the disk is rotated in the rotation direction.

3. The phosphor wheel of claim 2 wherein the leading edge of each airfoil is a rounded leading edge and the trailing edge of each airfoil is a sharp trailing edge.

4. The phosphor wheel of claim 3 wherein the airfoils further have a widest cross-section located between the rounded leading edge and the sharp trailing edge.

5. The phosphor wheel claim 4 wherein the wavelength conversion layer is disposed at a larger radial position than the impeller on the disk.

6. The phosphor wheel of claim 5 wherein the wavelength conversion layer comprises an annular wavelength conversion layer.

7. The phosphor wheel of claim 6 wherein the wavelength conversion layer is disposed on a single side of the disk and the impeller comprises vanes with all vanes of the impeller disposed on the same side of the disk as the wavelength conversion layer.

8. The phosphor wheel of claim 6 wherein the vanes include a first set of vanes disposed on a first side of the disk and a second set of vanes disposed on a second side of the disk opposite from the first side of the disk.

9. The phosphor wheel of claim 8 wherein the vanes are adhered onto the disk by an adhesive.

10. The phosphor wheel of claim 8 wherein the disk comprises sheet metal and the vanes protrude from the disk and are formed by sheet metal stamping.

11. The phosphor wheel of claim 8 wherein the vanes are formed by deposition of vane material onto the disk.

12. The phosphor wheel of claim 11 wherein the impeller protrudes from a surface of the disk on which the impeller is disposed by 2.0 mm or less.

13. The phosphor wheel of claim 12 further comprising:
   an electric motor operatively coupled with the disk to rotate the disk in the rotation direction.

14. The phosphor wheel of claim 13 further comprising:
   a light source arranged to output a pump beam impinging on the wavelength conversion layer.

15. The phosphor wheel of claim 14 wherein the light source is a laser or a light emitting diode (LED).

16. The phosphor wheel of claim 14 wherein the wavelength conversion layer comprises a yellow phosphor including one or more of cerium-substituted yttrium aluminum garnet (YAG:Ce), cerium-substituted terbium aluminum garnet (TAG:Ce), or europium-substituted barium orthosilicate (BOS) and a binder comprising a ceramic, a silicone, an epoxy, or a plastic.

17. A method of cooling the phosphor wheel of claim 1, the method comprising:
   rotating the disk in the rotation direction using an electric motor;
   while rotating the disk in the rotation direction, optically pumping the wavelength conversion layer comprising phosphor disposed on the disk to generate wavelength converted light; and while rotating the disk in the rotation direction, driving airflow across the wavelength conversion layer disposed on the disk using the impeller comprising airfoil-shaped vanes disposed on the disk wherein the impeller is operated by the rotating of the disk in the rotation direction.

18. The method of claim 17 wherein each airfoil-shaped vane has a rounded leading edge and a sharp trailing edge.

19. The method of claim 18 wherein the airfoil-shaped vanes further have a widest cross-section located between the rounded leading edge and the sharp trailing edge.

20. The method of claim 19 wherein the wavelength conversion layer is disposed at a larger radial position than the impeller on the disk, and the impeller comprises vanes shaped as airfoils to accelerate the airflow outwardly over the disk and across the wavelength conversion layer.

21. The method of claim 20 wherein the optical pumping uses blue or ultraviolet light having a largest spectral peak at or below 500 nm and the wavelength converted light has one or more spectral peaks at or above 500 nm.

22. A method of manufacturing a phosphor wheel, the method comprising:
disposing a wavelength conversion layer comprising phosphor on a first side of a disk; and
disposing or forming an impeller on the first side of the disk, wherein the impeller comprises airfoil-shaped vanes that are oriented to drive outward airflow across the disk and across the wavelength conversion layer when the disk is rotated in a rotation direction.

23. The method of manufacturing of claim 22 wherein the airfoil-shaped vanes have rounded leading edges and sharp trailing edges with each airfoil-shaped vane having its rounded leading edge disposed radially inward of its sharp trailing edge on the first side of the disk.

24. The method of manufacturing of claim 23 wherein the airfoil-shaped vanes further have a widest cross-section located between the rounded leading edge and the sharp trailing edge.

25. The method of manufacturing of claim 24 wherein the disposing or forming of the impeller on the disk comprises one of:
adhering vanes of the impeller onto the disk using an adhesive;
depositing vane material forming vanes of the impeller onto the disk; or
forming vanes of the impeller by sheet metal stamping.

26. The method of manufacturing of claim 25 wherein the disposing of the wavelength conversion layer on the disk consists of one of:
(i) depositing material forming the wavelength conversion layer on the disk; or
(ii) adhering the wavelength conversion layer onto the disk.

27. A phosphor wheel comprising:
a disk;
a wavelength conversion layer comprising phosphor disposed on the disk; and
an impeller disposed on the disk, the impeller comprising vanes which are shaped as airfoils with each vane oriented to drive outward airflow across the disk and across the wavelength conversion layer when the disk is rotated in a rotation direction, wherein the vanes are shaped as airfoils with each airfoil having its leading edge disposed radially inward of its trailing edge on the disk, and wherein the leading edge of each airfoil is a rounded leading edge and the trailing edge of each airfoil is a sharp trailing edge.

* * * * *